FLEXIBLE SUPERSONIC NOZZLE

Filed Feb. 6, 1950 2 Sheets-Sheet 1

Inventors
Harry J. Allen and
Robert N. Olson

By [signature]
Attorney

FLEXIBLE SUPERSONIC NOZZLE

Filed Feb. 6, 1950 2 Sheets-Sheet 2

Inventors
Harry J. Allen and
Robert N. Olson
By [signature]
Attorney

Patented Dec. 22, 1953 2,663,322

UNITED STATES PATENT OFFICE 2,663,322

FLEXIBLE SUPERSONIC NOZZLE

Harry J. Allen, Palo Alto, and Robert N. Olson, Santa Clara, Calif.

Application February 6, 1950, Serial No. 142,686

3 Claims. (Cl. 138—45)

(Granted under Title 35, U. S. Code (1952), sec. 266)

The present invention relates to an adjustable supersonic nozzle and more particularly to an adjustable supersonic nozzle for a wind tunnel in which the flow Mach number may be continuously adjusted by the application of a load at only a single station.

For adjusting the flow Mach number in a wind tunnel, it has been the practice in the prior art to employ a flexible plate and a system of adjustable supporting jacks positioned at regularly spaced stations along the plate, thus necessitating a separate adjustment for each jack each time the Mach number is to be changed. In addition this system has the disadvantages of a large number of moving parts and relatively large initial and upkeep expenses. The system further requires a great deal of time in calibrating each jack and may result in permanent damage to the plate due to inadvertent excessive movement of one or more of the jacks.

To obviate the inherent disadvantages of the system of the prior art, the present invention proposes a flexible plate rigidly supported at the test section end of the nozzle and free to move laterally at the entrance whenever a load is applied at one station. The station for the application of the load and the thickness variation of the plate are chosen so as to produce a deflection curve corresponding as closely as possible to the nozzle shapes required for the desired range of Mach numbers.

Accordingly, it is an object of the present invention to provide a supersonic wind tunnel nozzle in which the flow Mach number is continuously adjustable through the application of a load at one station only.

Another object is the provision of an adjustable supersonic wind tunnel nozzle requiring simple calibration and a minimum of upkeep.

A further object of the present invention is the provision of a supersonic wind tunnel nozzle which is virtually unsusceptible to damage due to inadvertent improper operation.

Still another object is to provide an adjustable supersonic wind tunnel nozzle having a flexible plate so dimensioned and loaded as to fix the deflection curve to approximate the nozzle shapes required for the desired Mach number range.

A still further object is to provide an adjustable supersonic wind tunnel nozzle having a readily replaceable flexible plate.

The exact nature of the present invention as well as other objects and advantages thereof will be readily apparent from consideration of the following detailed description relating the annexed drawings in which.

Figure 1:
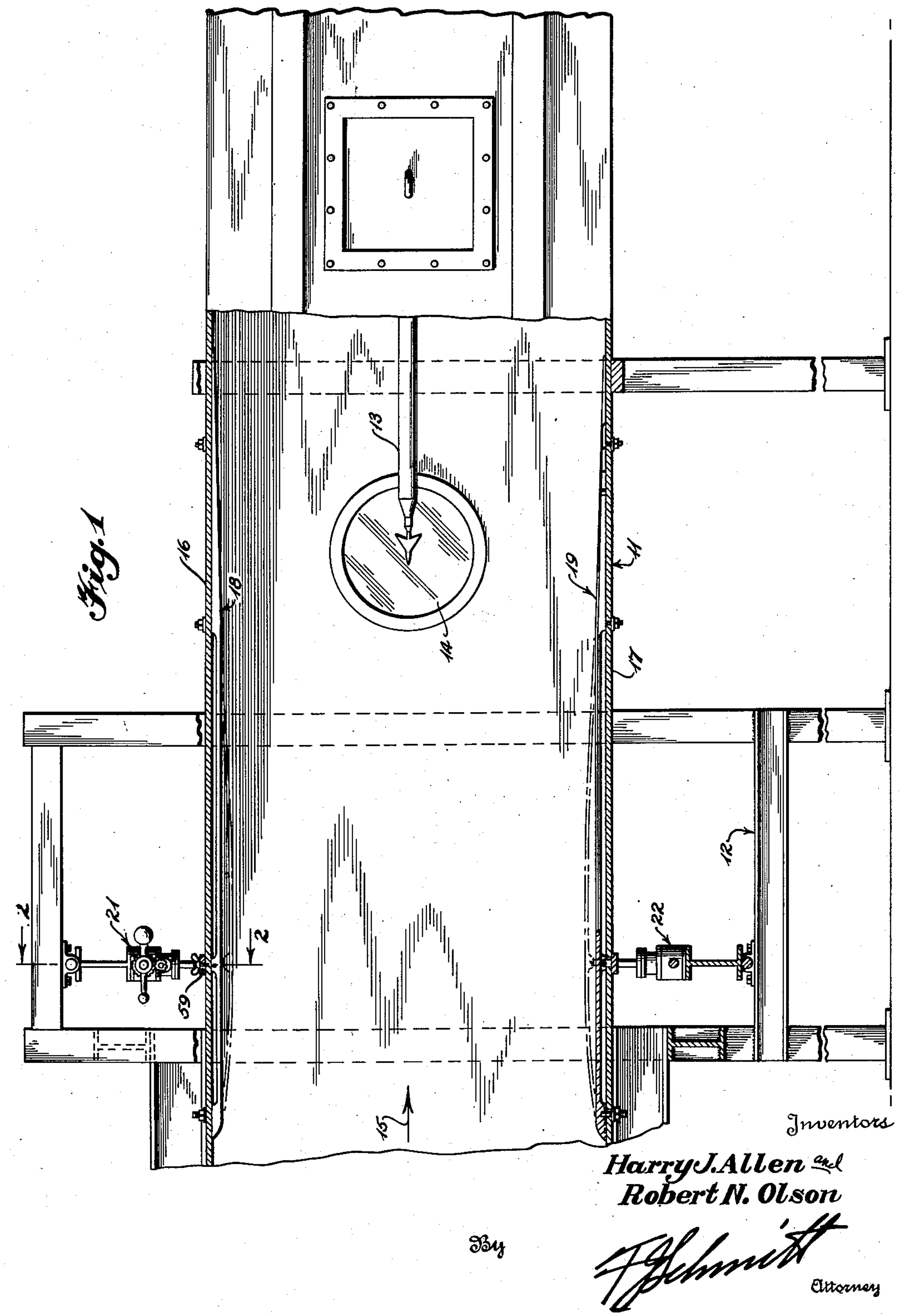
Fig. 1 is a side elevational view, partly broken away, of a section of a wind tunnel employing the adjustable nozzle of the present invention.

Referring now to the drawings, wherein like reference characters designate like or corresponding parts throughout the several views, there is shown in Fig. 1 a portion of a wind tunnel, generally designated 11, mounted on a support 12 and having a test section containing a target 13 therewithin and a viewing window 14 in one wall thereof, the direction of flow through the tunnel being indicated by arrow 15. Tunnel 11 comprises top and bottom walls 16 and 17, respectively, to which are secured flexible plates 18 and 19, respectively, in a manner to be described below.

Figure 2:
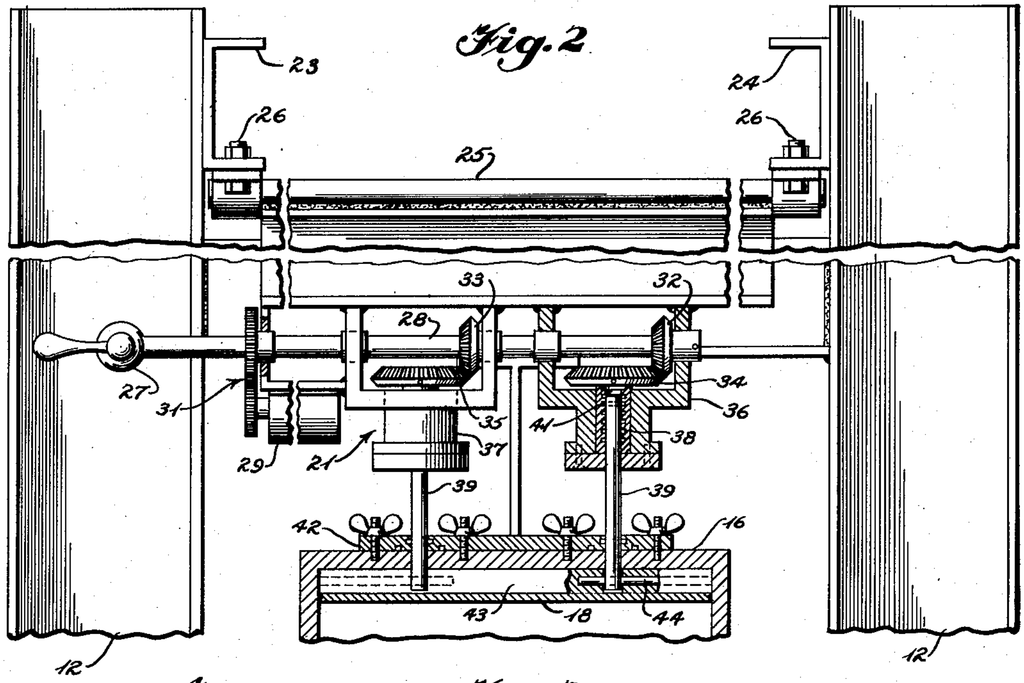
Fig. 2 is a section taken along the line 2—2 of Fig. 1, illustrating one form of adjusting means according to this invention.

Suitably secured to support 12 are a pair of lifting mechanisms or jacks 21 and 22 for adjusting the positions and the deflections of plates 18 and 19, respectively. As shown in Fig. 2, upper jack 21 is mounted on brackets 23 and 24 of support 12 by means of bracket 25, which is pivotally hung in hanger bearings held together by nut and bolt connections 26. Jack 21 comprises a hand crank 27, a through shaft 28 operatively connected to crank 27, and a counter 29 operatively connected to shaft 28 by means of gearing 31.

Shaft 28 carries a pair of bevel gears 32 and 33 which mesh at right angles with a pair of gears 34 and 35, respectively, gears 34 and 35 being rotatably mounted in brackets 36 and 37, respectively, welded or otherwise secured to bracket 25. Connected to each of gears 34 and 35 to rotate therewith is an internally threaded sleeve 38, there being a shaft 39 slidably mounted within sleeve 38 and carrying a key 41 at the upper end thereof. It is thus seen that movement of crank 27 in either direction will rotate gears 34 and 35 and the associated sleeve 38 to thereby ride key 41 up or down in sleeve 38 to slide shaft 39 up or down.

It is to be understood, of course, that the jack disclosed is merely illustrative of one form of device for carrying out the necessary lifting, and that any other form of jack, either manual or automatic, may be used without departing from the spirit and scope of the present invention.

Referring again to Fig. 2, it is seen that shafts 39 of jack 21 extend through a plate 42, mounted upon upper wall 16 of tunnel 11, and through wall 16 to a bossed portion 43 of plate 18, portion 43 being slotted and provided with a pin 44 which passes through shaft 39. It is thus seen that movement of shafts 39 will flex plate 18 in the manner shown in Fig. 1 to thereby vary the cross-sectional area of tunnel 11 at the station where the jacks are positioned without varying the area at the test station.

Figure 3:
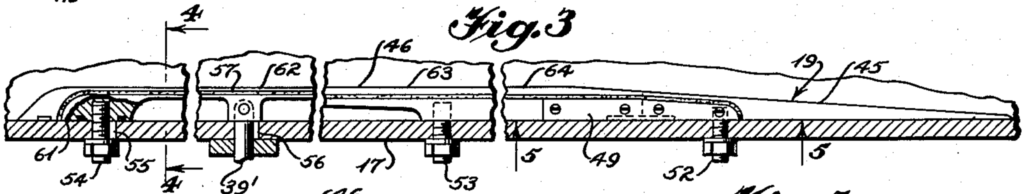
Fig. 3 is a fragmentary side elevation, partly in section, of one of the flexible plates of Fig. 1.

One form of plate according to the present invention is illustrated in Fig. 3, which illustrates the lower plate 19 and its connection to wall 17, plate 19 preferably being approximately 83 inches in length and comprising a short downstream section 45 and a long upstream section 46. As seen in Fig. 3, section 45 is tapered in the downstream direction, the taper being such that section 45 is one-sixteenth of an inch thick at its downstream end.

The upper surface of each of sections 45 and 46 must be smooth and free of all tool marks or other blemishes, since this surface is to be in direct contact with the air stream. Sections 45 and 46 are secured together by means of a bottom plate 47 having lugs 48 at opposite ends thereof which are closely fitted in corresponding gaps in the sections, and a pair of side plates 49, plates 47 and 49 being secured to sections 45 and 46 by any suitable means, such as screws 51.

Sections 45 and 46 are secured to wall 17 of tunnel 11 by means of bolts 52 mounted in section 45 and bolts 53 and 54 mounted in section 46, it being understood that other suitable mounting means may be used. In order to insure flexing of section 46 without a shearing of bolt 54 or a disruption of the fit, a slot 55 is provided in wall 17 in the downstream side thereof, slot 55 leaving a clearance of one-quarter of an inch when section 46 is in its unflexed position. A similar clearance slot 56 is provided in wall 17 adjacent shaft 39' of jack 22, and a slot 59 in plate 42 on the upstream side, as shown in Fig. 1.

Figure 4:
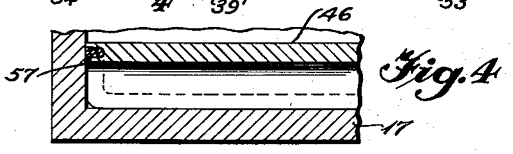
Fig. 4 is a section taken along the line 4—4 of Fig. 3, illustrating the sealing gasket of the present invention.
Figure 5:
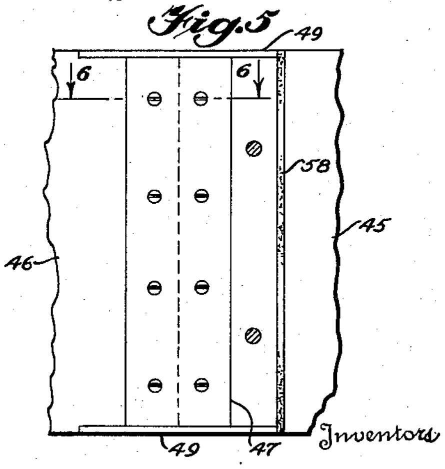
Fig. 5 is a section taken along the line 5—5 of Fig. 3, illustrating one mode of connecting the two sections of the flexible plate.
Figure 6:
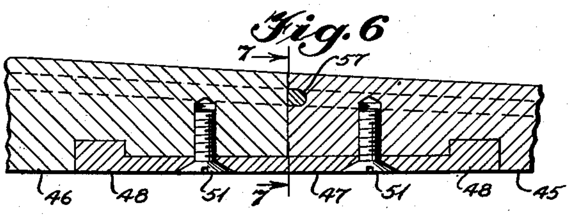
Fig. 6 is a section taken along the line 6—6 of Fig. 5, looking in the direction of the arrows.
Figure 7:
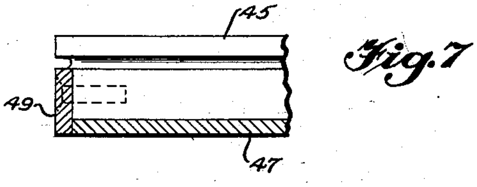
Fig. 7 is a section taken along the line 7—7 of Fig. 6.

In order to render plate 19 airtight and to prevent any of the air in the tunnel from reaching the underside thereof to thereby disrupt the flow, a sealing gasket 57, preferably made of rubber tubing, is provided, gasket 57 extending across the bottom of section 46 at its upstream end, as shown in Fig. 4, upwardly and longitudinally across tunnel 11 at both sides, as shown in Fig. 3, and across the downstream end of section 46 at the junction between sections 45 and 46, as shown in Figs. 6 and 7. A similar gasket 58 is provided for section 45, gasket 58 extending across the bottom surface of section 45, as shown in Fig. 5, and upwardly and longitudinally along opposite sides of section 45 to the junction of sections 45 and 46, as shown in Fig. 3.

In operation, bolts 54 on plates 18 and 19 are loosened, and jacks 21 and 22 are operated to permit flexing of plates 18 and 19, as shown in dashed lines in Fig. 1, the downstream ends of plates 18 and 19 remaining fixed at the test section. In this manner, the ratio of the cross-sectional areas at the nozzle entrance to that at the test section is varied to thereby vary the Mach number of the airstream. By proper selection of the point of application of jacks 21 and 22 and by proper selection of the dimensions of plates 18 and 19, the deflection curves of the plates substantially correspond to the nozzle shapes required for the desired range of Mach numbers. Similarly, counters 29 may be calibrated readily in terms of Mach numbers, or in areas, whichever may be more desirable.

In one embodiment which proved satisfactory, the overall length of each plate was 83⅓ inches, while the overall width was 11$\frac{31}{32}$ inches, the junction of sections 45 and 46 being 71⅝ inches from the upstream end. As shown in Fig. 3, section 46 consists of a boss portion 61, 3½ inches long; a longitudinal untapered portion 62, 25 inches long and 0.234 inches thick; a longitudinal portion 63 having an upper horizontal surface and a lower tapered surface, portion 63 being 26 inches long and 0.625 inch thick at its downstream end; and a test section portion 64, 17⅛ inches long and having a horizontal lower surface and an 0.060 inch tapered upper surface for 15⅛ inches, the remainder of the upper surface being curved to meet the upper surface of section 45. Section 45 is 11 inches long and has a horizontal lower surface and a tapered upper surface terminating in a rounded downstream end of $\frac{1}{16}$ inch thickness.

It is thus seen that the present invention provides a simple and easily manipulated adjustable nozzle for a supersonic wind tunnel wherein the lifting mechanisms are located at a single station at each plate thereby eliminating the necessity of multiple adjustments for each plate. It is further apparent that the invention provides a smooth and continuous adjustment of the nozzle cross-sectional area at the upstream end to permit a continuous adjustment of the airstream Mach number within the desired range.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. In combination with a fluid duct having opposed walls, an adjustable nozzle comprising a pair of flexible plates one mounted on each of said opposed walls, each of said plates having a thickened front and rear portion connected by an intermediate thin portion, the outer surface of each portion of each plate having a smooth outer contour throughout the length of each plate, means rigidly attaching one end of each plate to each of said walls, means movably attaching the other end of each plate to each of said walls, and means for applying a load at a transverse station on each of said plates at said intermediate portion to thereby vary the cross-sectional area of the nozzle at said station.

2. An adjustable nozzle for a supersonic wind tunnel comprised of a tunnel section having a pair of opposed walls, a plate mounted on each of said walls, said plates each having a relatively thick front portion, a relatively thick rear portion and a thin intermediate flexible portion connected therebetween and in spaced relation to said walls, the surface of said plates away from said wall being smooth and the rear portions of said plates being tapered and diminished in thickness toward their ends, means fixedly securing said rear portions to said walls, and means movably securing said front portions to said walls, a single thickened portion transverse of each of said flexible thin portions and means for applying thrust to each of the thickened transverse portion at right angles to the walls.

3. An adjustable nozzle for a supersonic wind tunnel comprised of a tunnel section having a pair of opposed walls, a plate mounted on each of said walls, said plates each having a relatively thick front portion, a relatively thick rear portion and a thin intermediate flexible portion connected therebetween and in spaced relation to said walls, the surface of said plates away from said wall being smooth and the rear portions of said plates being tapered and diminished in thickness toward their ends, means fixedly securing said rear portions to said walls, and means movably securing said front portions to said walls, and means for applying thrust to each of said intermediate portions.

HARRY J. ALLEN.
ROBERT N. OLSON.

References Cited in the file of this patent

UNITED STATES PATENTS

| Number | Name | Date |
|---|---|---|
| 1,095,767 | Adams | May 5, 1914 |
| 2,424,654 | Gamble | July 29, 1947 |
| 2,434,835 | Colley | Jan. 20, 1948 |
| 2,448,966 | Fales | Sept. 7, 1948 |
| 2,462,953 | Eaton et al. | Mar. 1, 1949 |
| 2,472,949 | Jackson | June 14, 1949 |
| 2,486,287 | Jackson | Oct. 25, 1949 |
| 2,560,634 | Colley | July 17, 1951 |

FOREIGN PATENTS

| Number | Country | Date |
|---|---|---|
| 587,263 | France | Jan. 14, 1925 |
| 789,809 | France | Aug. 26, 1935 |